(No Model.) 3 Sheets—Sheet 1.
E. B. BARKER.
PHOTOGRAPHIC CAMERA.
No. 402,711. Patented May 7, 1889.
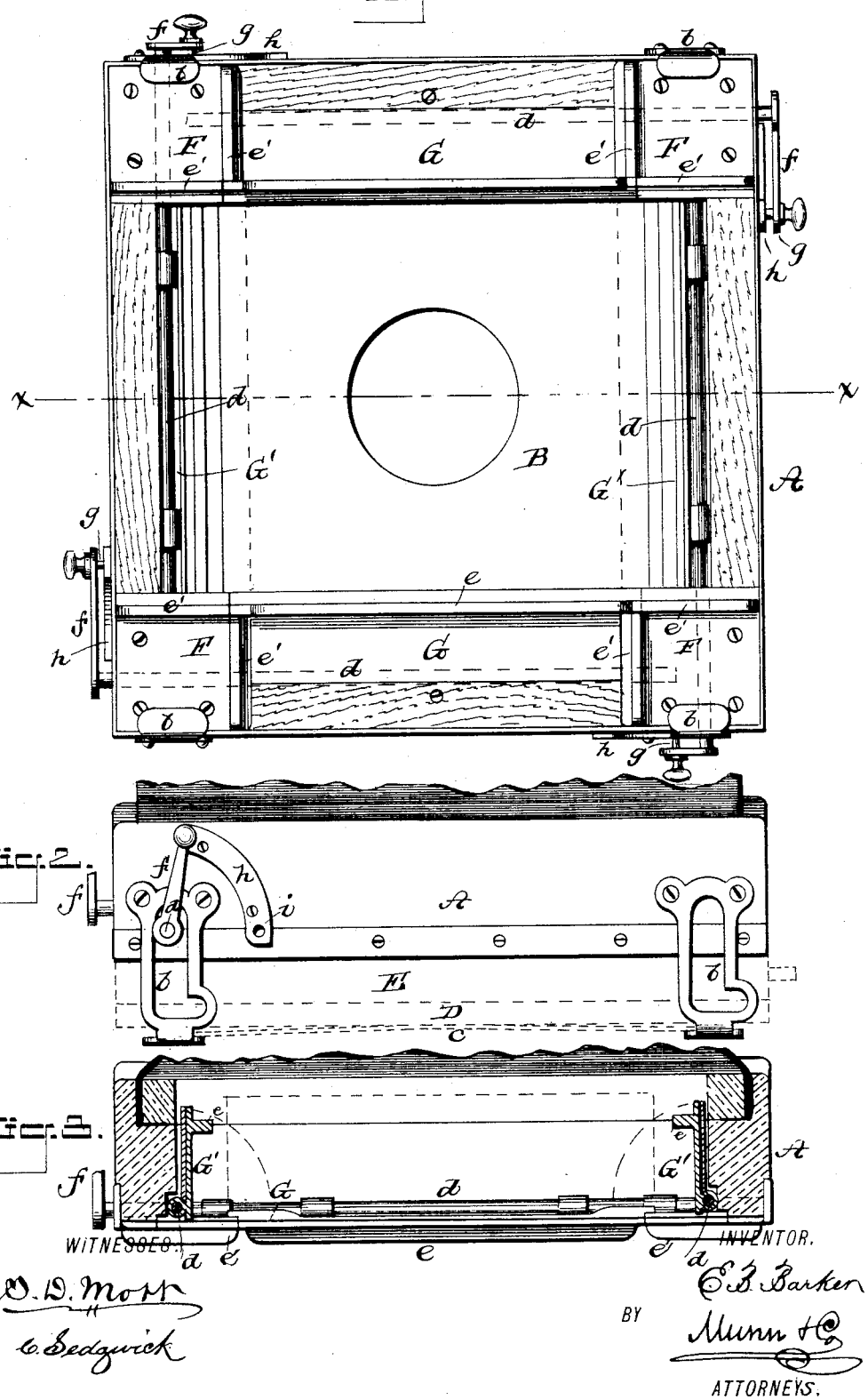

(No Model.) 3 Sheets—Sheet 2.

E. B. BARKER.
PHOTOGRAPHIC CAMERA.

No. 402,711. Patented May 7, 1889.

WITNESSES:
O. D. Mott
C. Sedgwick

INVENTOR,
E. B. Barker

BY
Munn & Co
ATTORNEYS.

(No Model.) 3 Sheets—Sheet 3.

E. B. BARKER.
PHOTOGRAPHIC CAMERA.

No. 402,711. Patented May 7, 1889.

WITNESSES:
O. D. Mott
C. Sedgwick

INVENTOR.
E. B. Barker
BY Munn & Co.
ATTORNEYS.

N. PETERS, Photo-Lithographer, Washington, D. C.

UNITED STATES PATENT OFFICE.

ERASTUS B. BARKER, OF NEWARK, NEW JERSEY.

PHOTOGRAPHIC CAMERA.

SPECIFICATION forming part of Letters Patent No. 402,711, dated May 7, 1889.

Application filed January 16, 1889. Serial No. 296,480. (No model.)

*To all whom it may concern:*

Be it known that I, ERASTUS B. BARKER, residing in the city of Newark, county of Essex, and State of New Jersey, have invented a new and useful Improvement in Photographic Cameras, of which the following is a full, clear, and exact description.

This invention, which is applicable to photographic cameras of different descriptions so far as their general construction and operation are concerned, consists in novel means, substantially as hereinafter described, and pointed out in the claims, for using the sensitive plate of greater length than width, as usual, so as to give either a longitudinal or transverse exposure—that is, so that it will have its greatest length either in an approximately horizontal or other given direction, or in a direction transversely thereto, without restriction, however, to the angularity of the plane in which the plate-holder lies. The necessity for this to photograph views or objects of different kinds or in different positions on sensitive plates or films of greater length than width—as, for instance, in taking horizontal and vertical pictures by varying the position of the plate-holder in the camera—is well understood.

For convenience' sake the invention will here be shown as applied to a camera in which a ground-glass frame for focusing is permanently connected with the body of the camera in an adjustable manner, as by means of springs and slotted guides, to admit of the ground glass being drawn outward away from the end of the camera-body to introduce the plate-holder between said body or back of the camera and the ground glass when required, or to admit of the ground-glass frame shutting close up against the back of the camera-body; but such adjustable ground-glass frame forms no part of this invention, which, as hereinbefore observed, is applicable to cameras generally, and this without regard to any ground-glass provisions for focusing.

Reference is to be had to the accompanying drawings, forming a part of this specification, in which similar letters of reference indicate corresponding parts in all the figures.

Figure 4:
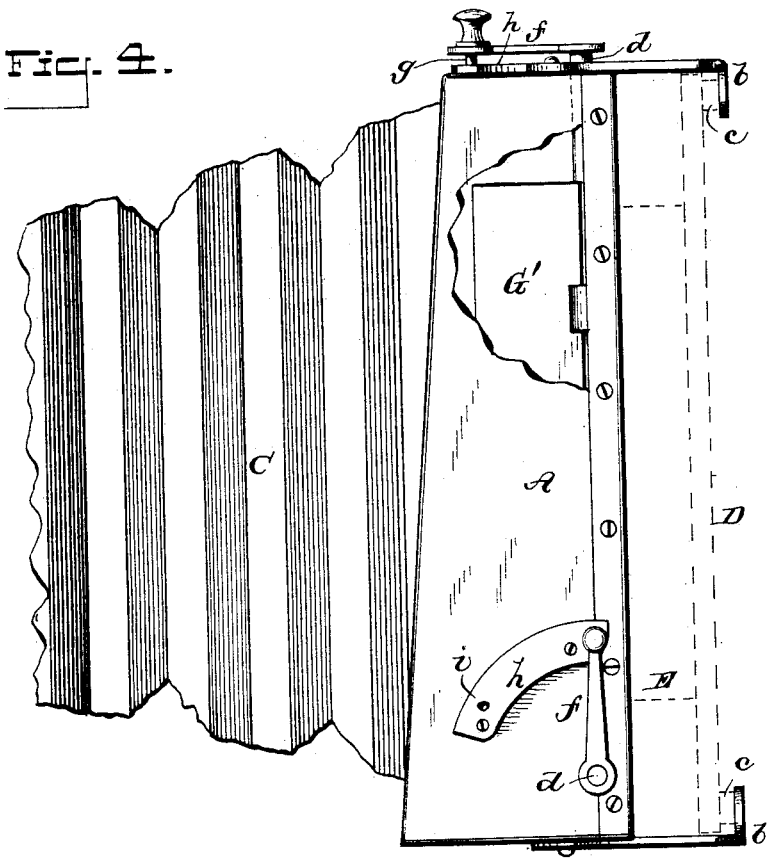
Figure 5:
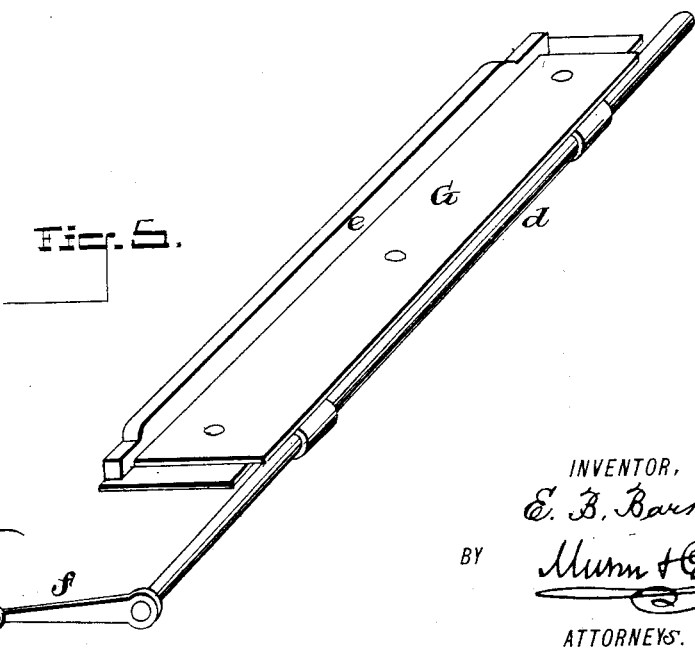
Figure 6:
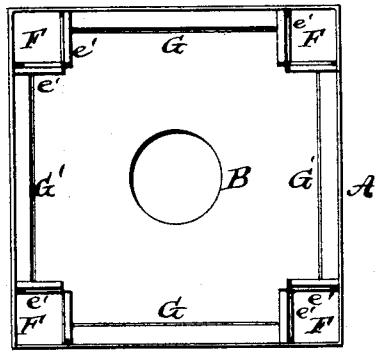
Figure 7:
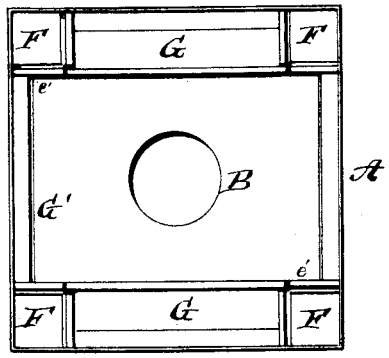
Figure 8:
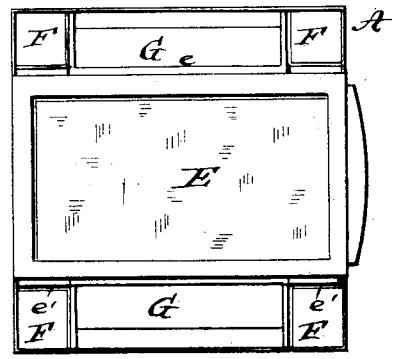
Figure 9:
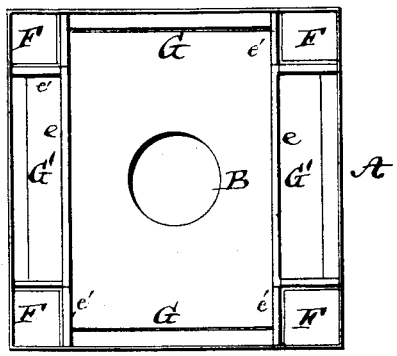

Figure 1 represents a back view of a camera, in part, with my invention applied. Fig. 2 is a plan view of the same, in part; and Fig. 3, a horizontal section thereof, in part, upon the line $x\,x$ in Fig. 1. Fig. 4 is a partly-broken side elevation of the camera-body, in part, with the invention applied. Fig. 5 is a view in perspective of one of a series of movable wings or shutters connected with the camera-body to provide for varying the position of the plate-holder, as hereinbefore described. Fig. 6 is a back view of the camera-body, in part, showing said movable wings or shutters as adjusted back within the body or out of the way. Fig. 7 is a similar view showing certain of the series of movable wings as adjusted into position for insertion of the plate-holder horizontally in direction of its length. Fig. 8 is a like view to Fig. 7 with the plate-holder in position. Fig. 9 is a similar end view of the camera-body, in part, with others of the series of movable wings as adjusted into position for insertion of the plate-holder vertically in direction of its length; and Fig. 10 is a like view to Fig. 9 with the plate-holder in position.

A indicates the back of the camera-body, and B its front or lens end frame or board, and C the connecting focusing-bellows.

D is the hereinbefore-referred-to ground-glass frame (shown by dotted lines) permanently connected with the back A, as by attached pins, working in fixed slotted guides $b$, and acted upon by springs $c\,c$ at its back to open and close away from or toward the back frame, A, but which, as hereinbefore observed, forms no part of this invention, inasmuch as any other suitable means may be used to hold the plate-holder when inserted in position.

Figure 10:
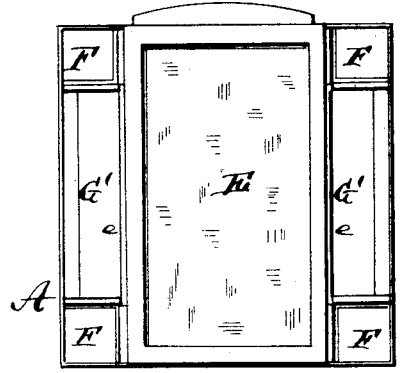

The exposure-opening in the frame or back A is substantially square, as shown, for instance in Fig. 6, and this opening has its area contracted above and below or at its upright sides or ends, as required, to provide for the insertion of the oblong sensitive plate or film holder E, either horizontally in the camera, as shown in Fig. 8, or vertically therein, as shown in Fig. 10. This virtually constitutes a camera-back having an exposing-opening capable of presenting an oblong shape with its length either in a horizontal or vertical direction, as desired. The means which I employ for doing this are a series of movable wings or shutters arranged along the top and bottom and sides or ends of the back or plate-holder-carrying frame A. These movable wings or adjustable frame-pieces might be variously constructed and applied to thus contract, when necessary, the exposure-opening in the back A in different or crossing directions for the purpose of receiving the plate-holder E either in a horizontal or vertical direction; but I prefer to construct each of said wings of a single piece, and to provide for the opening or closing of them in a folding or hinged manner with their axis of motion in direction of their length, and so that when closed they will shut up within the back A, and when thrown open will form facial frame-pieces or shutters to contract or shape the exposure-opening in the back A, as required. Thus G G and G' G' indicate such upper and lower and side or end movable wings or shutters applied to the back A and arranged to work within or between opposite corner-plates F, that project facially within the angles formed at the junction of the top and bottom and side or end walls of the exposure-opening in said back A. Said wings, which are of a plate-like construction, are each made fast along their one longitudinal or back margin to a hinge pin or rod, d, and are provided on their faces near their opposite longitudinal margin with guide-ribs e, for directing or guiding and supporting the plate-holder E when sliding the same to its place in the camera—as, for instance, between the end frame, A, and ground-glass frame D. The plates F may also be similarly provided with guide-ribs e', which, when the wings are adjusted to receive the plate-holder, are in alignment with the corresponding guide-ribs, e, on the wings and for the same purpose. When the upper and lower wings G G are respectively adjusted, the one up and the other down, as shown in Figs. 1, 7, and 8 of the drawings, then the camera is set to receive the oblong plate-holder E horizontally, as shown in Fig. 8, said plate-holder being slid between the upper and lower guide-ribs, e e'. The end or upright wings, G' G', are then turned in or back, as seen more clearly in Fig. 3. When, however, the upper and lower wings G G are turned in or back and the upright or end wings, G' G', are turned in front or outward, as shown in Figs. 9 and 10, then the camera is set to receive the plate-holder E in direction of its length vertically, as shown in Fig. 10, said plate-holder being then slid in between the upright guide-ribs e e'. These wings G and G' may be adjusted, as described, by extending their hinge-pins d at their one end through or to the outside of the rear end frame, A, and fitting such extended portion of each hinge-pin with a spring or other handle, f, having a locking-stud, g, on its inner face, which, in the movement of each handle to open or close the movable wing to which it applies, travels over a plate, h, on the end frame and snaps into or engages with a hole, i, near each end of the plate h, to hold the wing open or closed, as may be.

In the foregoing specification I have set forth and described one of the forms of my back-shutters which I consider best for construction and operation; but I do not limit or confine myself to the exact form or arrangement of parts shown, as it will be readily understood that various other forms and arrangements of the parts might be made without departing from my invention.

Having thus described my invention, what I claim as new, and desire to secure by Letters Patent, is—

1. In a photographic camera, the construction of the back with adjustable shutters, substantially as described, whereby the back and the back-opening may be quickly adjusted to the reception of the plate-holder for the taking of either vertical or horizontal pictures, as set forth.

2. In a photographic camera, the combination, with a back frame, of adjustable shutters adapted to enlarge or contract the opening in the back in horizontal and vertical directions, as and for the purposes herein shown and described.

3. In a photographic camera, the back frame provided with upper and lower and side or end movable wings or shutters adapted to provide for insertion of the plate-holder in directions transverse to each other, essentially as specified.

4. In a photographic camera, the back frame provided with upper and lower and side or end movable wings or shutters having guide-ribs on their faces for the plate-holder, and adapted to provide for the insertion of the plate-holder in directions transverse to each other, substantially as described.

5. The combination, with the back frame, A, of the hinged wings G G G' G', having their axis of motion in direction of their length, essentially as and for the purpose herein set forth.

6. The combination, with the camera-back A, of the corner-plates F, arranged to project within the opening in said back and having guide-ribs e', and the hinged shutters G G', having corresponding guide-ribs, e, for operation in relation with said plates, essentially as shown and described, and for the purpose specified.

7. The combination, with the camera-back A, of the hinged wings or shutters G G G' G', their attached hinged pins d, arranged to extend in direction of the length of said shutters and outside of the back A, and an adjusting and locking handle applied to the outer end extension of said rods for holding the shutters open or closed, as desired, substantially as specified.

ERASTUS B. BARKER.

Witnesses:
EDGAR TATE,
C. SEDGWICK.